United States Patent [19]

Kim

[11] Patent Number: 5,730,177

[45] Date of Patent: Mar. 24, 1998

[54] TIRE AIR-INJECTION DEVICE

[75] Inventor: Sung-Ha Kim, Seoul, Rep. of Korea

[73] Assignee: Kia Motors Corporation, Seoul, Rep. of Korea

[21] Appl. No.: 667,688

[22] Filed: Jun. 21, 1996

[30] Foreign Application Priority Data

Apr. 22, 1996 [KR] Rep. of Korea ............... 1996-12183

[51] Int. Cl.⁶ ........................................... B60C 23/14
[52] U.S. Cl. ................. 137/224; 137/227; 137/355; 137/355.12; 137/355.16; 152/416
[58] Field of Search ................. 137/224, 227, 137/351, 355, 355.12, 355.16, 355.2; 152/416

[56] References Cited

U.S. PATENT DOCUMENTS

| | | | |
|---|---|---|---|
| 1,441,572 | 1/1923 | France | 137/355 |
| 1,796,482 | 3/1931 | Schmidt | 152/416 |
| 3,240,240 | 3/1966 | Crabb | 152/416 X |
| 3,335,766 | 8/1967 | Winger | 135/355.12 X |
| 4,197,895 | 4/1980 | Reyes | 152/416 |
| 4,582,108 | 4/1986 | Markow et al. | 137/355 X |
| 4,583,566 | 4/1986 | Kalavitz et al. | 137/224 X |
| 4,815,758 | 3/1989 | Yoshida | 152/416 X |

FOREIGN PATENT DOCUMENTS 30768  12/1930  Australia ................. 152/416

*Primary Examiner*—John Rivell

[57] ABSTRACT

The present invention is a tire air-injection device provided in the car for easily and rapidly injecting air into a tire to maintain the tire pressure at an optimal level when tire pressure drops below a reference value. A compressor provided in the car is connected to an engine of the car through a power transfer means by operating a main switch, which is provided at the outside of the car. Compressed air is injected in the tire by the compressor into the tire through a flexible hose of which one end is connected to the compressor. A relief valve, which is provided for regulating pressure of the air flowing through the hose.

5 Claims, 4 Drawing Sheets

TIRE AIR-INJECTION DEVICE

FIELD OF THE INVENTION

The present invention relates to a tire air-injection device and, more particularly, to an air-injection device which can be installed in a car in order to easily and rapidly inject air into a tire to maintain the tire pressure at an optimal level when the tire pressure drops below a reference value.

PRIOR ART

Generally, the recommended tire pressure for any model of a vehicle is carefully calculated for the purpose of: providing satisfactory ride & stability, better steering control, reduced tread wear, longer tire life, and resistance to general deterioration of the tire. If the tire pressure is too high, there is the increased susceptibility to rupture or puncture of the tire with a heavy vehicle load. If the tire pressure is too low, handling safety among other qualities deteriorate. Therefore, there is a need for tire pressure to be maintained at an optimal level so as to maintain optimal driving conditions.

Tire pressure may naturally decrease over time as air charged inside of the tire leaks out due to the weight of the vehicle. In such a case, tire pressure drops below an optimal level. Accordingly, a driver should make careful check to properly maintain and adjust the tire fluid pressure for optimal performance. Usually, the driver bring the vehicle to an auto service station to regulate the tire fluid pressure. There is, however, incurred to the driver the inconvenient cost of time and money of going to the auto service station only for the purpose of regulating tire pressure.

Although there is offered a foot operated pump for injecting air in the tire, the mechanism itself is shown to unreliable and cumbersome to use.

SUMMARY OF THE INVENTION

It is an object of the present invention to provide a tire air-injection device which is integrally equipped in the vehicle body, and can be used to inject air into the tire whenever needed or desired by the driver, whereby the tire pressure can be maintained at an optimal pressure.

To achieve the above object, the present invention provides a tire air-injection device comprising:

an operating panel recessed in a space defined on a vehicle body and hidden underneath a removable lid;

an air compressor, for compressing air by using power from an engine, connected to the engine through a power transfer means controlled by a main switch disposed on the operating panel;

a flexible hose, for forming a fluid passage, where one end of the hose extends through the operating panel on which an adapter is provided and the other end is connected to the air compressor;

a relief valve, which is provided at a point on the flexible hose, for regulating pressure of air flowing through the hose so as to ensure optimal pressure is not exceeded;

a pressure regulator knob, which is provided on the operating panel, for regulating the fluid pressure by adjusting the relief valve;

an air gun attached to the adapter and coupled to an air inlet of the tire to inject the air into the tire; and a winding mechanism to either extend and recede the hose from the vehicle body.

According to another embodiment of the present invention, an indication lamp which is activated when the tire pressure of reaches to a predetermined optimal pressure value to inform of the state of the fluid pressure of the tire.

According to another embodiment of the present invention the winding mechanism further comprises of:

a base portion formed on the operating panel;

a rotary handle recessed in a groove formed on a surface of the base portion;

a knob provided on one end of the rotary handle;

a drive shaft passing through the operating panel from the base portion and provided with a first bevel gear on its one end; and a second driven shaft having a second bevel gear meshing with the first bevel gear and a winding portion on which the hose is wound.

It is preferable that the lid is opened and closed in the same manner as a lid for a fuel tank.

It is also preferable that the engine speed for drive the air compressor is set at about 800–1500 rpm.

BRIEF DESCRIPTION OF THE DRAWINGS

A more complete appreciation of this invention, and many of the attendant advantages thereof, will be readily apparent with reference to the following detailed description and with the accompanying drawings, wherein.

DETAILED DESCRIPTION OF THE INVENTION

Figure 1:
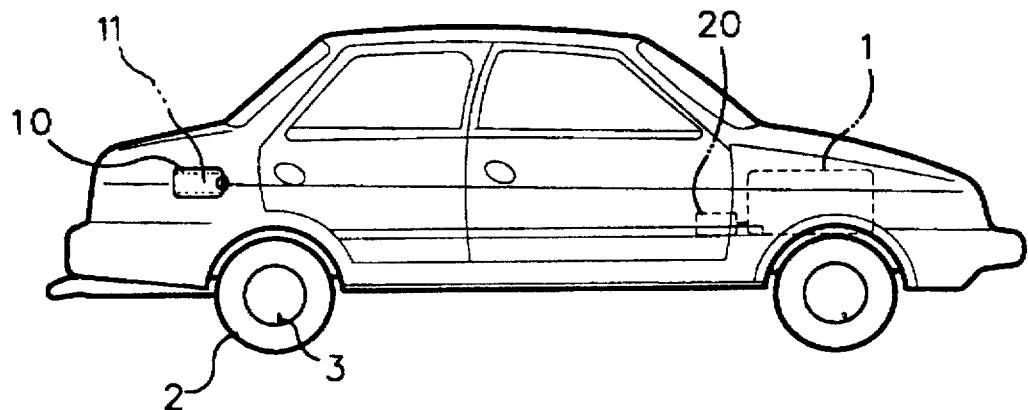
FIG. 1 is a schematic view showing an automobile having an operating panel for operating a tire air-injection device according to a preferred embodiment of the present invention.

Referring first to FIG. 1, a tire air-injection device according to a preferred embodiment of the present invention is equipped on a rear fender. The tire air-injection device is concealed by a lid 10 which opens and closes similar to that of the lid used for concealing the gas tank. Alternatively, the lid 10 may be opened or closed in a sliding manner.

Figure 2:
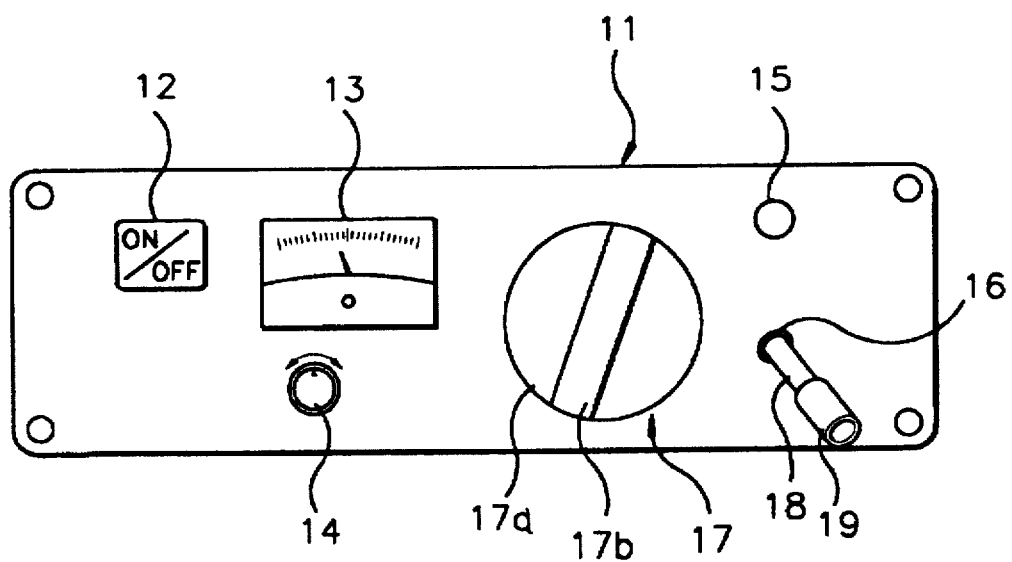
FIG. 2 is a schematic view illustrating an operating panel for operating a tire air-injection device according to a preferred embodiment of the present invention.

When the lid 10 is opened, an operating panel 11 appears on the outside as shown in FIG. 2. An air compressor 20 formed on an engine room (not shown) is connected to an engine 1 by a power transfer means such as a clutch (not shown), which is operated by an ON/OFF operation of a main switch 12, so as to compress air. One end of a flexible hose 18 for transferring the compressed air is connected to the air compressor. Conversely, the other end of the flexible hose 18 appears on the outside passing through an opening 16 and is provided with an adapter 19. Since the diameter of the adapter 19 is larger than that of the opening 16, and the diameter of the hose 18 is smaller than that of the opening 16, the other end of the hose 18 comes to be stuck on the operating panel 11.

Figure 3:
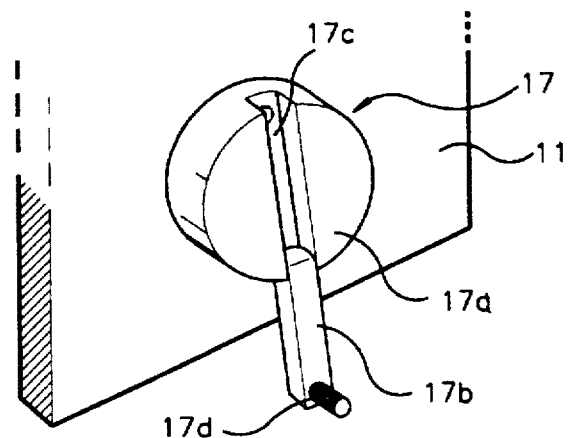
FIG. 3 is a perspective view illustrating a flexible hose handle according to a preferred embodiment of the present invention.

The flexible hose 18 can be extended out by winding mechanism 17 provided on the operation panel 11. The winding mechanism 17 comprises a base portion 17a formed on the operating panel 11 and a rotary handle 17b for easily rotating the base portion 17a. The base portion 17a, as shown in FIG. 3, is formed with a groove 17c for receiving the rotary handle 17b on its surface. At one end of the rotary handle 17b, a pin (not shown) is pivotally provided on one side of the groove 17c. In addition, at the other end of the rotary handle 17b, a knob 17d is provided for easy handling. The knob 17d, when it is not used, is recessed into an opening (not shown) formed on a portion corresponding to a bottom surface of the groove 17c.

Figure 4:
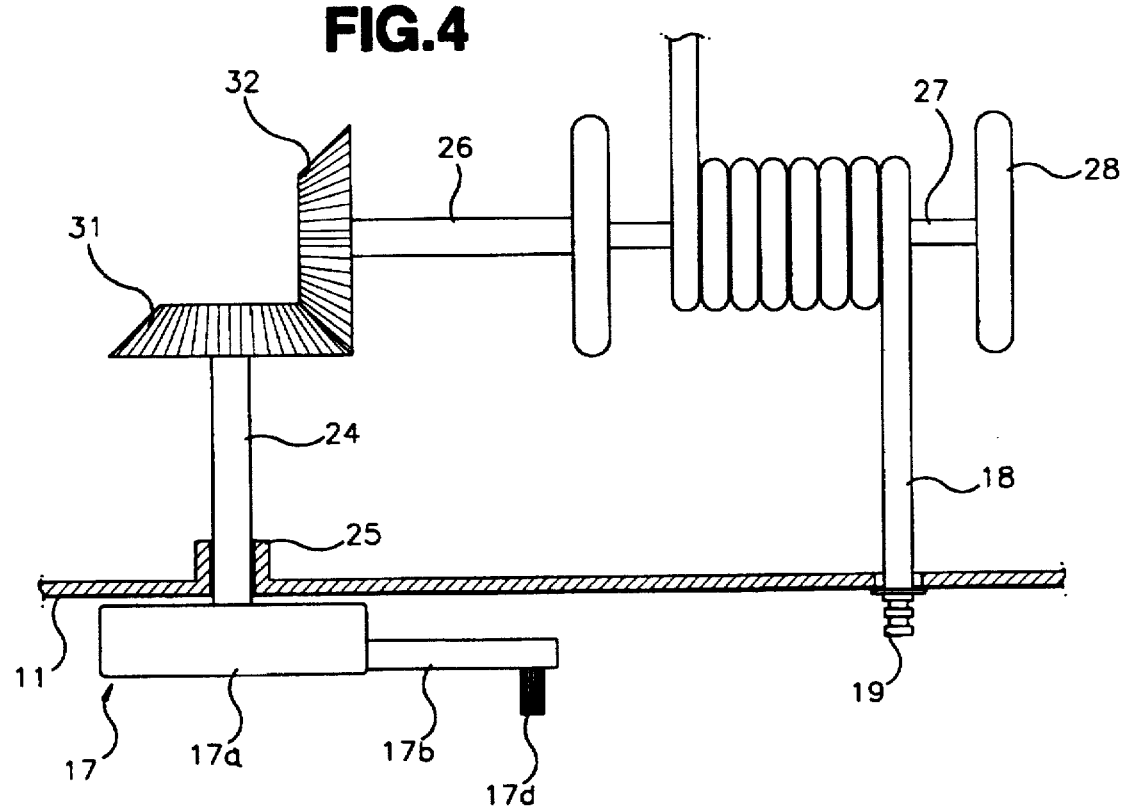
FIG. 4 is a schematic view showing a winding mechanism according to a preferred embodiment of the present invention.

Referring to FIG. 4, a first drive shaft 24 is formed on a rear face of the base portion of the winding mechanism 17. The drive shaft 24 passes through an opening formed on the operating panel 11, extending toward a rear side and the opening is provided with a bush 25 to enhance the rotation of the drive shaft 24. A first bevel gear 31 is formed on one end of the drive shaft 24. The first bevel gear 31 meshes with a second bevel gear 32 which is on a second driven shaft 26 to be vertical to the drive shaft 24 and parallel with the operating panel 11. Therefore, the driven shaft 26 rotates by the rotation of the drive shaft 24 by the engagement of the first and second bevel gears 31 and 32.

The driven shaft 26 has a winding portion 27 around which the hose 18, appearing through the operating panel 11 by the adapter 19, is wound. The winding portion 27 rotates with the driven shaft 26. A pair of guide plates 28 are also respectively disposed on opposite sides of the winding portion 27 so as to prevent the hose 18 from deviating when it is wound or extended.

Preferably, the length of the hose 18 wound on the winding portion 27 is determined so that the hose 18 can extend to all tires of the vehicle, thereby allowing the device to inject air into all the tires.

Figure 5:
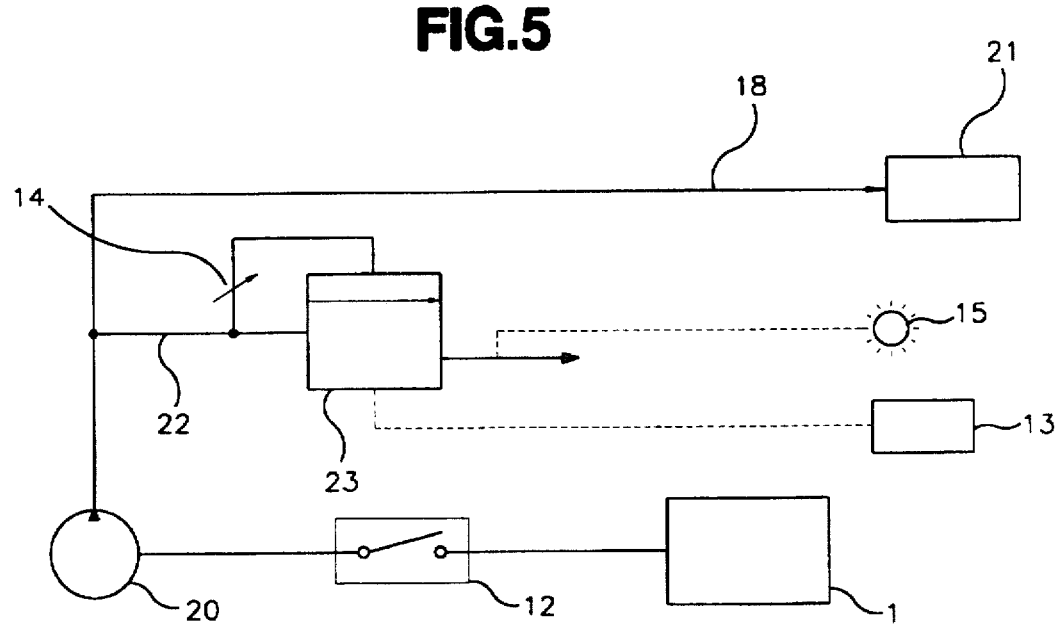
FIG. 5 is a schematic diagram for showing a pneumatic circuit for operating a tire air-injection device according to a preferred embodiment of the present invention.
Figure 6:
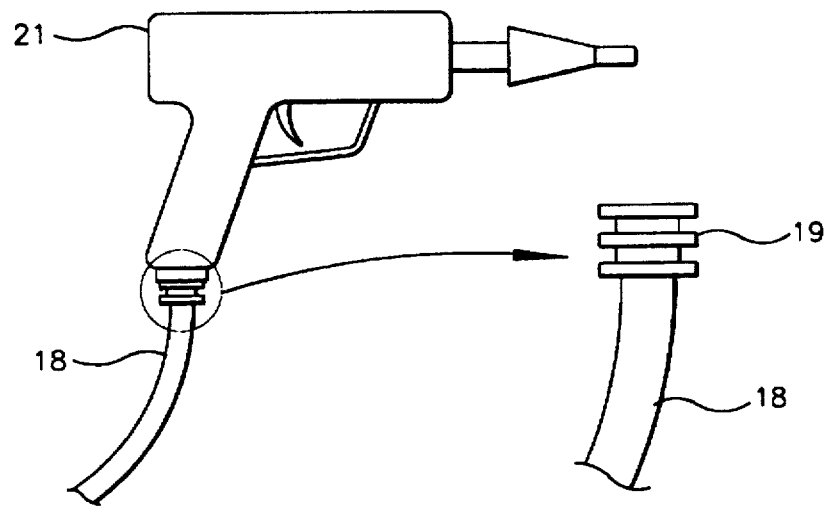
FIG. 6 is a schematic view showing an air gun applied to a tire air-injection device according to a preferred embodiment of the present invention.
Figure 7:
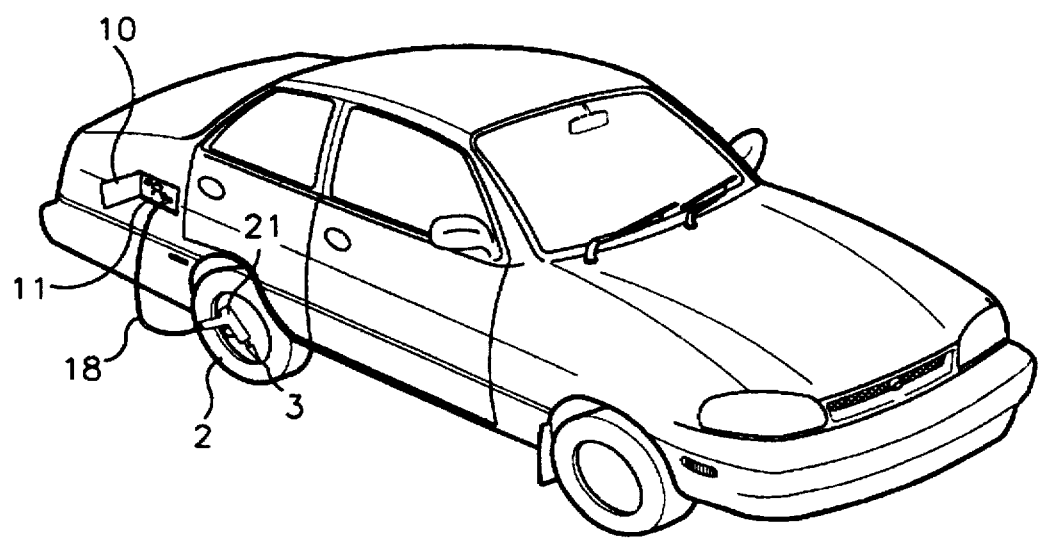
FIG. 7 is a schematic view showing an example of using a tire air-injection device according to a preferred embodiment of the present invention.

FIG. 5 shows a pneumatic circuit for driving the tire air-injection device according to a preferred embodiment of the present invention. When the fluid pressure drops below a reference value and the main switch 12 formed on the operating panel 11 is depressed by a user to inject the air into a tire, the compressor 20 receives power from the engine 1 through the power transfer means (such as the clutch) and compresses the air.

The operating panel 11 is further provided with a pressure regulator knob 14 for regulating a relief valve 23 formed on a fluid passage 22 provided on the hose 18. The relief valve 23 serves to maintain the fluid pressure so as to ensure optimal pressure is not exceeded.

The pressure regulator knob 14 carried on the operating panel 11 regulates the relief valve 23 to variably adjust the tire pressure. Therefore, the user may adjust the fluid pressure to the tire 2 by manipulating the pressure regulator knob 14 as required.

The compressed air is fed to the tire through the hose 18. At this point, the fluid pressure applied to the tire 2 through the hose 18 is regulated by the relief valve 23 adjusted by the pressure regulator knob 14. The fluid pressure of the tire 2 set by the relief valve 23 is indicated by a pressure gauge 13.

In addition, the relief valve 23 is connected to an indication lamp 15 which is turned on in accordance with the operation of the pressure gauge 13, when the fluid pressure of the tire 2 reaches to the optimal level, to inform of the state of the fluid pressure of the tire.

An example of how to use the tire air-injection device will be described in the following. First, the user opens the lid 10 formed on the vehicle body in a state where the engine 1 is running and the hose is extended from the panel 11 to an air inlet 3 of the tire 2. An air gun 21, is attached to the hose 18 via an adapter 19 formed at one of the hose. The air gun 21 is then inserted into the air inlet 3.

At this point, the pressure regulator knob 14 provided on the operating panel 11 is adjusted to set the desired level of the fluid pressure of the tire 2. After setting the fluid pressure of the tire 2, the user depresses the main switch 12 to transmit the power of the engine to the compressor through the power transfer means such a clutch. Preferably, the engine speed is set at about 800–1500 rpm so as to be sufficient to drive the compressor. The compressed air is pumped into the tire 2 through the air gun 21 that is coupled to the air inlet 3. As the compressed air is injected into the tire 2, when the fluid pressure 2 of the tire is increased to the optimal value, which is set by the relief valve 23 in accordance with the adjustment of the pressure regulator knob 14, the pressure gauge 13 is operated and thereby the indication lamp 15 is turned on to let the user know that the tire 2 is filled with air to a suitable fluid pressure.

When finishing pumping the air into the tire, the user depresses the main switch 12 to disconnect the engine 1 to the air compressor 20, whereby the engine is returned to a normal state. And then, by rotating the knob 17d of the winding mechanism 17 provided on the operating panel 11, the drive shaft 24 connected to the winding mechanism 17 is rotated, thereby rotating the winding portion 27 through the driven shaft 26. Accordingly, the hose 18 is wound on the winding portion 27. After winding of the hose 18 is complete, the lid is closed to conceal the operating panel so as to not detract from the outward appearance of the vehicle.

As described above, the tire air-injection device according to the present invention can be used to pump air into the tire whenever and wherever desired, whereby the fluid pressure of the tire can be maintained at an optimal level.

In addition, the tire air-injection device can be used as a power source for each tool used for changing the tire.

While the invention has been described in connection with what is presently considered to be most practical and preferred embodiments, it is to be understood that the invention is not limited to the disclosed embodiments, but, on the contrary, it is intended to cover various modifications and equivalent arrangements included within the spirit and scope of the appended claims.

What is claimed is:

1. A tire air-injection device comprising:

an operating panel recessed in a space defined on a vehicle body and hidden underneath a removable lid or cover;

an air compressor, for compressing air by using power from an engine, connected to the engine through a power transfer means controlled by a main switch disposed on the operating panel;

a flexible hose, for forming a fluid passage, where one end of the hose extends through the operating panel on which an adapter is provided and the other end is connected to the air compressor;

a relief valve, which is provided at a point on the flexible hose, for regulating pressure of the air flowing through the hose so as to ensure optimal pressure is not exceeded;

a pressure regulator knob, which is provided on the operating panel, for regulating fluid pressure by adjusting the relief valve;

an air gun attached to the adapter and coupled to an air inlet of the tire to inject the air into the tire; and a winding mechanism to either extend and recede the hose from the vehicle body.

2. The tire air-injection device according to claim 1 further comprising an indication lamp which is activated when the tire pressure reaches a predetermined optimal pressure value to inform of the state of the fluid pressure of the tire.

3. The tire air-injection device according to claim 1, wherein the winding mechanism further comprises:

a base portion formed on the operating panel;

a rotary handle recessed in a groove formed on a surface of the base portion;

a knob provided on one end of the rotary handle;

a drive shaft passing through the operating panel from the base portion and provided with a first bevel gear on its one end; and a second driven shaft having a second bevel gear meshing with the first bevel gear and a winding portion on which the hose is wound.

4. The tire air-injection device according to claim 1, wherein the lid or cover is opened and closed in the same manner as a lid for a fuel tank.

5. The tire air-injection device according to claim 1, wherein the engine speed for driving the air compressor is set at about 800–1500 rpm.

* * * * *